(12) United States Patent
Thaker

(10) Patent No.: US 11,288,150 B2
(45) Date of Patent: Mar. 29, 2022

(54) RECOVERY MATURITY INDEX (RMI)-BASED CONTROL OF DISASTER RECOVERY

(71) Applicant: Sungard Availability Services, LP, Wayne, PA (US)

(72) Inventor: Darpan Thaker, Herndon, VA (US)

(73) Assignee: Sungard Availability Services, LP, Wayne, PA (US)

( * ) Notice: Subject to any disclaimer, the term of this patent is extended or adjusted under 35 U.S.C. 154(b) by 0 days.

(21) Appl. No.: 16/868,135

(22) Filed: May 6, 2020

(65) Prior Publication Data
US 2021/0149779 A1    May 20, 2021

Related U.S. Application Data

(60) Provisional application No. 62/922,239, filed on Nov. 18, 2019.

(51) Int. Cl.
| | |
|---|---|
| G06F 11/00 | (2006.01) |
| G06F 11/22 | (2006.01) |
| G06F 11/27 | (2006.01) |
| G06F 11/14 | (2006.01) |
| G06F 11/263 | (2006.01) |

(52) U.S. Cl.
CPC ...... *G06F 11/2289* (2013.01); *G06F 11/1464* (2013.01); *G06F 11/1469* (2013.01); *G06F 11/2215* (2013.01); *G06F 11/263* (2013.01); *G06F 11/27* (2013.01)

(58) Field of Classification Search
CPC ............. G06F 11/2289; G06F 11/1464; G06F 11/1469; G06F 11/2215; G06F 11/263; G06F 11/27; G06F 11/008; G06F 11/0709
See application file for complete search history.

(56) References Cited

U.S. PATENT DOCUMENTS

| | | |
|---|---|---|
| 6,496,941 B1 | 12/2002 | Segal et al. |
| 8,301,480 B2 | 10/2012 | Ramachandran |
| 9,208,006 B2 | 12/2015 | Jones et al. |

(Continued)

FOREIGN PATENT DOCUMENTS

EP    1226523 A4    3/2004

OTHER PUBLICATIONS

International Search Report and Written Opinion Dated Mar. 16, 2021 for Related PCT/US20/060936.

(Continued)

*Primary Examiner* — Joseph D Manoskey
(74) *Attorney, Agent, or Firm* — David J. Thibodeau, Jr.; VLP Law Group LLP

(57) ABSTRACT

A Recovery Maturity Index 1 (RMM) is used to determine whether a particular Information Technology (IT) production environment is relatively mature enough to successfully execute the disaster recovery (DR). The RMI provides a quantitative analysis in terms of a set of categories for elements that characterize the environment and multiple elements for each category. At least some of the elements depend upon the extent to which automation components have been leveraged for disaster recovery. A summation of the scoring elements, which may be a weighted summation, results in an overall quantitative metric. The metric can used to determine whether or not disaster recovery can be expected to be successful.

18 Claims, 6 Drawing Sheets

(56) References Cited

U.S. PATENT DOCUMENTS

| | | | |
|---|---|---|---|
| 9,292,695 | B1 | 3/2016 | Bassett |
| 9,477,555 | B1 | 10/2016 | Hagan et al. |
| 9,836,365 | B2 | 12/2017 | Ray |
| 2007/0061180 | A1 | 3/2007 | Offenberg |
| 2010/0077257 | A1* | 3/2010 | Burchfield ............ G06F 11/261 714/37 |
| 2015/0007261 | A1 | 1/2015 | Hecht et al. |
| 2015/0317194 | A1* | 11/2015 | Sampath ............. G06F 11/2023 714/703 |
| 2015/0347242 | A1* | 12/2015 | Martos ................. G06F 11/203 714/19 |
| 2018/0067824 | A1* | 3/2018 | Conti .................. G06F 11/1471 |
| 2019/0243737 | A1* | 8/2019 | Savino ................. H04L 41/147 |

OTHER PUBLICATIONS https://go.forrester.com/blogs/09-11-16-measuring_disaster_recovery_maturity/; "Measuring Disaster Recovery Maturity," (Apr. 9, 2019).

* cited by examiner

| RMM Index: 9.00 | | | | | | | |
|---|---|---|---|---|---|---|---|
| | RLCM | \multicolumn{4}{c}{Automation*} | Test History | Recovery Trend |
| | | ABD | ARD | RES | CDR | | |
| Outcome | Yes | Yes | Manual | Yes | Yes | Red | Green |
| Score | 60.00 | 6.25 | 6.25 | 6.25 | 6.25 | 0.00 | 5.00 |

FIG. 5

RECOVERY MATURITY INDEX (RMI)-BASED CONTROL OF DISASTER RECOVERY

BACKGROUND

As Information Technology (IT) systems have become increasingly critical to the smooth operation of an organization, and arguably the economy as a whole, the importance of ensuring continued operation and rapid recovery of those systems has increased. Preparation for recovery of systems involves a significant investment of time and money, with the aim of ensuring minimal loss in the event of a disruptive event.

Prior to selecting a disaster recovery (DR) strategy, a disaster recovery administrator first refers to their organization's business continuity plan which may indicate expected metrics such as a Recovery Point Objective (RPO) or Recovery Time Objective (RTO) for various IT functions (such as payroll, order processing, accounting, manufacturing, etc.). These metrics are then mapped to the underlying systems and infrastructure that support those functions. The DR planner can determine the most suitable recovery strategy for each system.

In many cases, an organization may elect to use an outsourced disaster recovery service provider to provide a stand-by site and systems, rather than using their own facilities, increasingly via cloud computing.

It is often the case that planning for disaster recovery is thus coordinated between an organization's responsible administrator(s) and the outside service provider. These disaster recovery plans are often expensive to devise, and it can become difficult for the personnel on both sides, the customer and the service provider, to keep up with rapidly changing computing environments. In one approach, which may in part or in full take the form of a database, can store information on available resources such as replication technologies for implementing disaster recovery plans. The recovery documentation can include information concerning infrastructure and best practices that should be observed when implementing the disaster recovery plan.

The recovery documentation should accurately represent the configuration of the protected IT environment, as well as how the customer expects systems to optimally behave during a disaster or a during some other planned event such as a recovery test. The service provider can then properly advise the customer with its best recommendations for how to recover the environment in the event of a disaster.

It is often the case that the disaster recovery service provider does not manage the configuration of the protected IT environment. Thus, the service provider typically does not have direct visibility into the nuances of how the affected data processing systems work or how they are configured or their expected optimal behavior. Any changes made by the customer to its configuration or to the desired optimal recovery state can also potentially impact the ability for the service provider to successfully recover the affected systems.

One known solution is to develop a Recovery Maturity Model (RMM) that characterizes a protected IT environment's expected ability to successfully execute a DR test or DR recovery. See for example, U.S. Pat. No. 9,208,006 assigned to Sungard Availability Services LP, the assignee of the present application, which is incorporated by reference in its entirety.

Technologies that can assist with orderly recovery include Recovery Execution System (RES) that uses programmatically generated workflows, as described in U.S. Pat. No. 9,836,365 also assigned to Sungard Availability Services LP, the assignee of the present application, and which is incorporated by reference in its entirety.

Still other approaches, such as Touch Free Disaster Recovery, can leverage RES and automated configuration discovery tools to identify and recover only those resources which are within a certain scope. See for example, U.S. Pat. No. 10,210,079 also assigned to Sungard Availability Services LP, the assignee of the present application, and which is incorporated by reference.

SUMMARY

Even with planning and guidance from an outside service provider who specializes in disaster recovery (DR), a given IT production environment may simply not yet be ready for even executing a test of a disaster recovery plan, never mind being ready to successfully accomplish an actual recovery.

Backup and replication discovery tools, and more sophisticated automation capabilities such as the Recovery Execution System (RES) or Touch Free Disaster Recovery (TFDR) mentioned above enjoy increasing use. These automation tools have become widespread enough that they should be considered in evaluating the robustness of a recovery strategy. In some cases, it is the customer's decision whether to use a particular automation capability or not—in other instances, external service providers implement these automation tools on behalf of the customer. Regardless of how they are managed, if a protected environment is not using an available automation tool, those state(s) should consider since their use may make recovery more robust by eliminating human errors.

What is needed is an approach that first determines readiness of an Information Technology (IT) production environment to execute a disaster recovery plan, prior to actually executing or finalizing the plan parameters. The approach should take into account whether automation tools are being properly leveraged. With the approach provided here, a Recovery Maturity Index (RMI) is used to determine whether a particular production environment can be expected, with some level of confidence, to successfully execute a disaster recovery. The RMI is based on a quantitative analysis of the production environment in terms of certain elements, such as the extent to which Life Cycle Management (RLCM) is complete, what kind of automation capabilities are used for recovery, and/or what are the recovery trend and test history. Scoring these elements then arrives at a Recovery Maturity Index (RMI) that then informs the administrator of one or more criteria and/or actions indicative of successful recovery execution. Scoring may be based on a summation of the scoring elements, which may be a weighted summation, to provide an overall RMI score indicative of the maturity of the IT environment to successfully complete a recovery.

The RMI provides specific and targeted quantitative analysis around categories of automation components that the disaster recovery service provider deems necessary for successful recovery execution within the service provider's domain. The provider of the DR services is typically familiar with the various categories of automation components and services, which may include the aforementioned RES (TFDR), or other automation tools such as Automated Production Configuration Discovery, Automated Backup and Replication Discovery and the like.

Changes in a production environment is a constant process, and failure to reflect those changes in the recovery environment is one of main reasons recovery plans fail. Recovery Life Cycle Management (LLCM) is a process defined to incorporate a DR team (either an internal team or a service provider team) into a Production Change Management process. This is to ensure that all approved production changes are thoroughly reviewed by the DR team, so that any affected recovery plans and procedures are updated to ensure that IT environment is recoverable at any time. RLCM is thus a critical factor to be considered for RMI. Often times, customers of DR service providers do not provide enough emphasis on RLCM, leading to delayed or failed recovery of systems/applications during a planned recovery test or actual disaster recovery event.

Automation components also play a critical role in overall DR recovery. It is imperative to implement automation tools when available (such as application discovery or RES) to avoid human errors, increase recovery success rate, and reduce overall recovery time by eliminating manual recovery to great extent.

Prior histories of successful DR tests also demonstrate maturity of the DR plan and procedures, and a positive recovery trend exhibiting reduced recovery time over successive recovery tests can also be factored into the RMI score.

BRIEF DESCRIPTION OF THE DRAWINGS

FIG. 5 is an example RMI dashboard.

DETAILED DESCRIPTION

Figure 1:
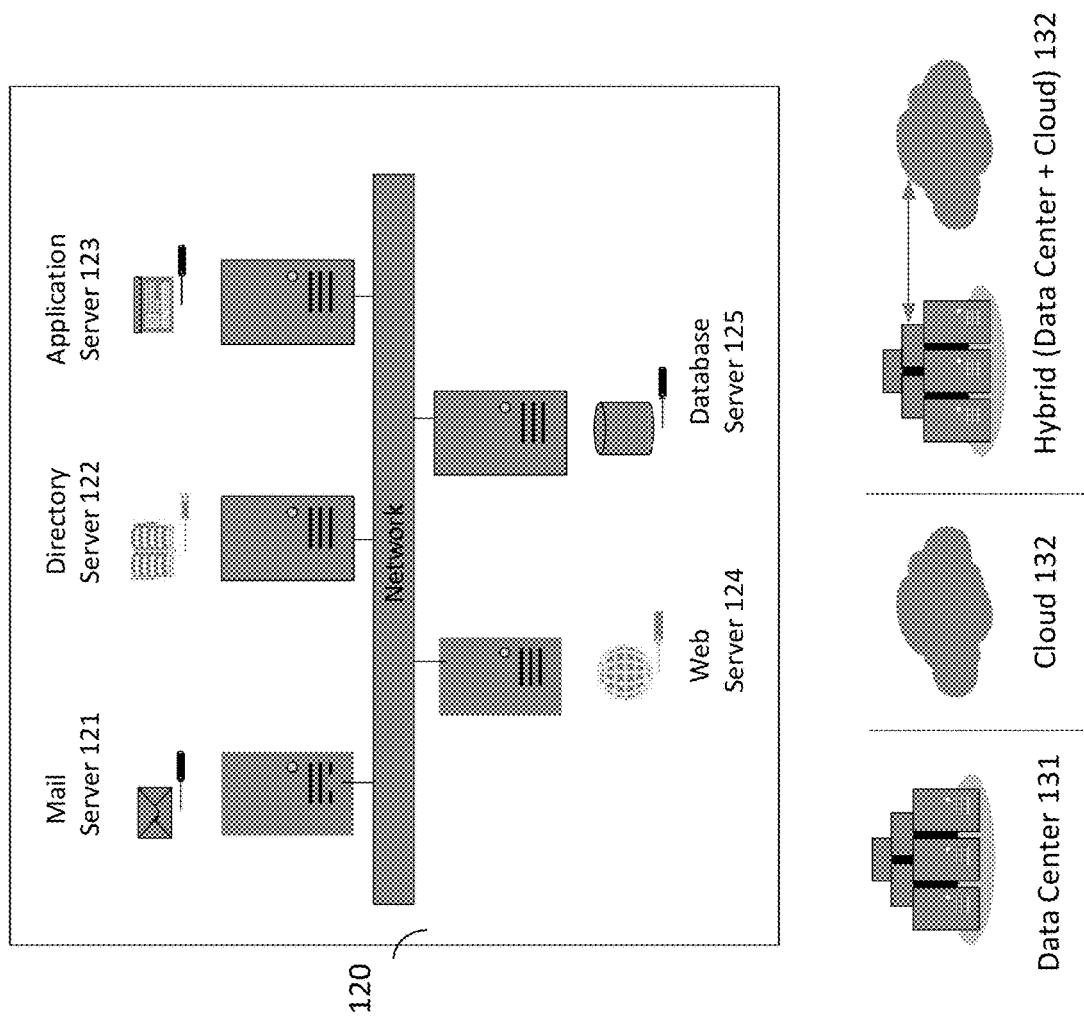
FIG. 1 illustrates an example production environment operated by a customer of a disaster recovery (DR) service provider.

FIG. 1 is a high-level diagram showing a typical information technology (IT) production environment 100 that consists of a number of data processing machines. In this example, the production environment 100 is a customer of a disaster recovery (DR) service provider 200 (shown in FIG. 2). The DR service provider 200 has been contracted to provide recovery for some or all of the information technology (IT) resources in the production environment 100 (which will also be referred to herein as the "protected environment" 100).

The protected resources 120 in the example production environment 100 may include, for example, a mail server 121, directory server 122, application server 123, web server 124, and database server 125. These resources can be owned and operated by the customer itself in its own data center 131. However, the resources 120, in whole or in part, can be co-located on leased premises (not shown), or hosted by a cloud service 132, or as some type of hybrid cloud environment 133 where some resources are hosted in the customer's own local data center(s) and other components in cloud service. As long as the service provider has access to these resources, the manner in which they are deployed does not matter. But the customer should provide access to the resources, at least for the purpose of discovering their configuration.

Often times the operator of the production environment 100 has engaged the services of the DR service provider 200 because they are not particularly comfortable placing business-critical applications in remote servers, such as co-located or cloud-based resources. These can be driven by security or other concerns such as unfamiliarity with their behavior during critical events such as disaster recovery. As long as that customer has the appropriate access to discover the configuration of these systems, and can share that information with the DR service provider 200, the advantages of approaches discussed herein can be realized.

The resources, such as the servers 121-125, each have respective recoverable components. These components may include one or more application software programs, operating system(s) 104, memory resources 105, storage resources 106, networks and the like. It is common that the resources 121-125 in the production environment 100 may also consist of one or more virtual machines 107 each also considered to have associated applications, operating systems, memory, disks and other peripherals (also not shown). These components should be discoverable (or provided) in order for the DR service provider 200 to perform the processes described below.

Figure 2:
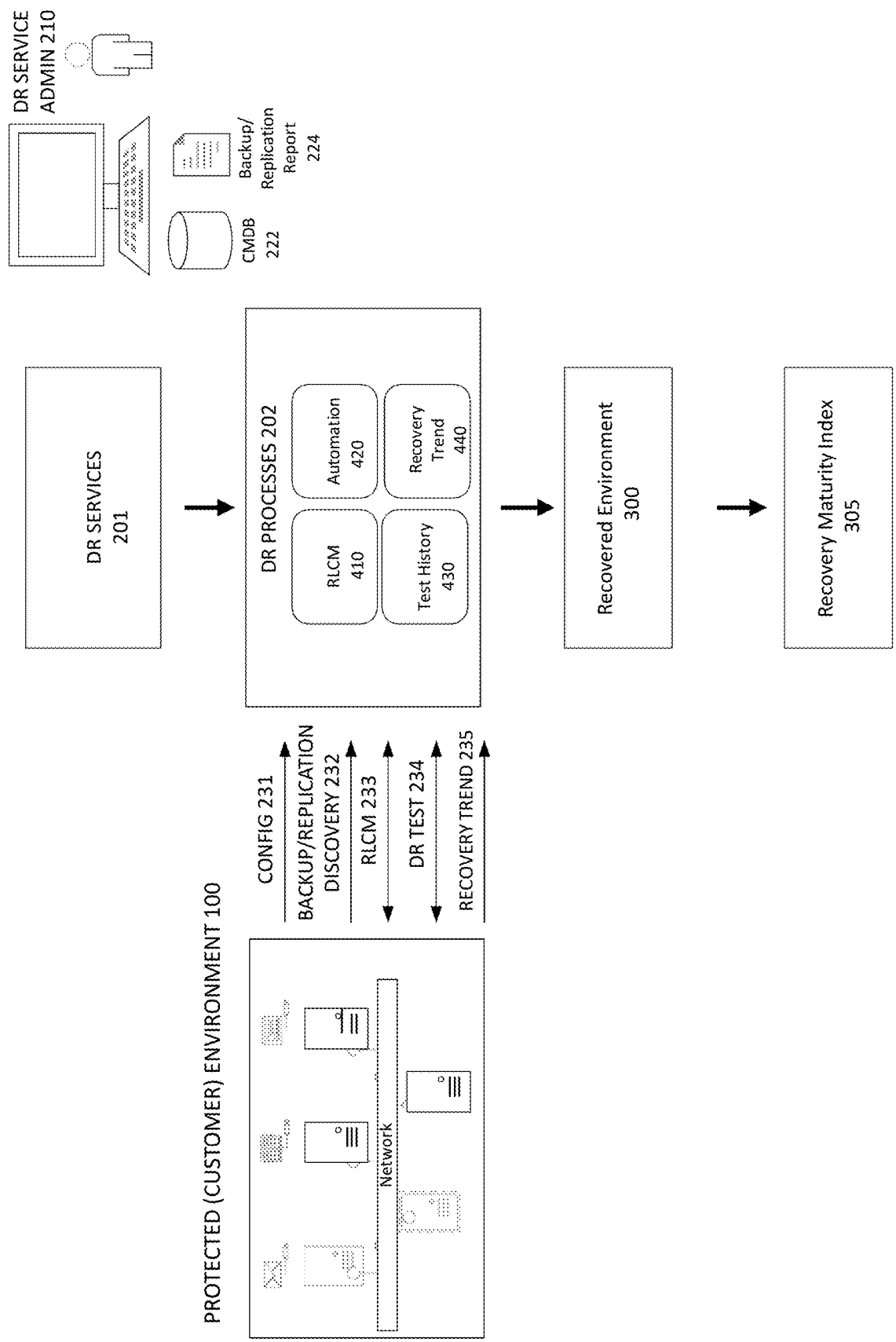
FIG. 2 shows the DR service provider in more detail.

Turning attention to FIG. 2, the DR service provider 200 provides Disaster Recovery (DR) services 201 that support DR processes 202. The DR processes 202 include various policies and/or procedures related to preparing for recovery (such as DR test processes), and/or other procedures for the actual recovery of the IT infrastructure in the production environment 100 after a natural or human induced disaster.

The DR service provider 200 typically has one or more administrative users 210 that communicate and coordinate these DR processes 202 with a customer administrator 110. For example, the DR service provider 200 may provide disaster recovery or tests processes 202 that are to be executed by the infrastructure in the production environment 100. These different DR processes 202 are typically tailored for the specific attributes of the production environment 100. It is also common for service providers 200 to manage access to infrastructure in a separate disaster recovery environment 300. For example, a DR process 202 that is a disaster recovery test 234 might include replication of a storage device 106 to another storage device in the disaster recovery environment 300. Many other types of DR tests are possible. More generally, by executing disaster recovery tests processes 202, a customer 100 of the DR service 200 may determine whether or not they are properly prepared to withstand a disaster.

As part of the DR processes 202, the customer environment 100 and service provider 200 exchange various pieces of information such as configuration 231 and backup/replication discovery data 232.

As mentioned previously, DR test procedures 234 are typical of the DR processes 202. Of interest here, however, is that the DR processes 202 also include a Recovery Life Cycle Management (RLCM) 410, Automation 420, Test History 430, and Recovery Trend 440 components. Each of these components is discussed in more detail below.

A Configuration Management Database (CMDB) 222 may be used to maintain environment configuration information for one or more customers 100 of the service provider 200. The information stored in the CMBD 222 is used by the DR processes 202. Related reports containing the results of executing the DR processes 202 such as backup/replication 232, or the results of the DR tests 234 may also be maintained.

Figure 3:
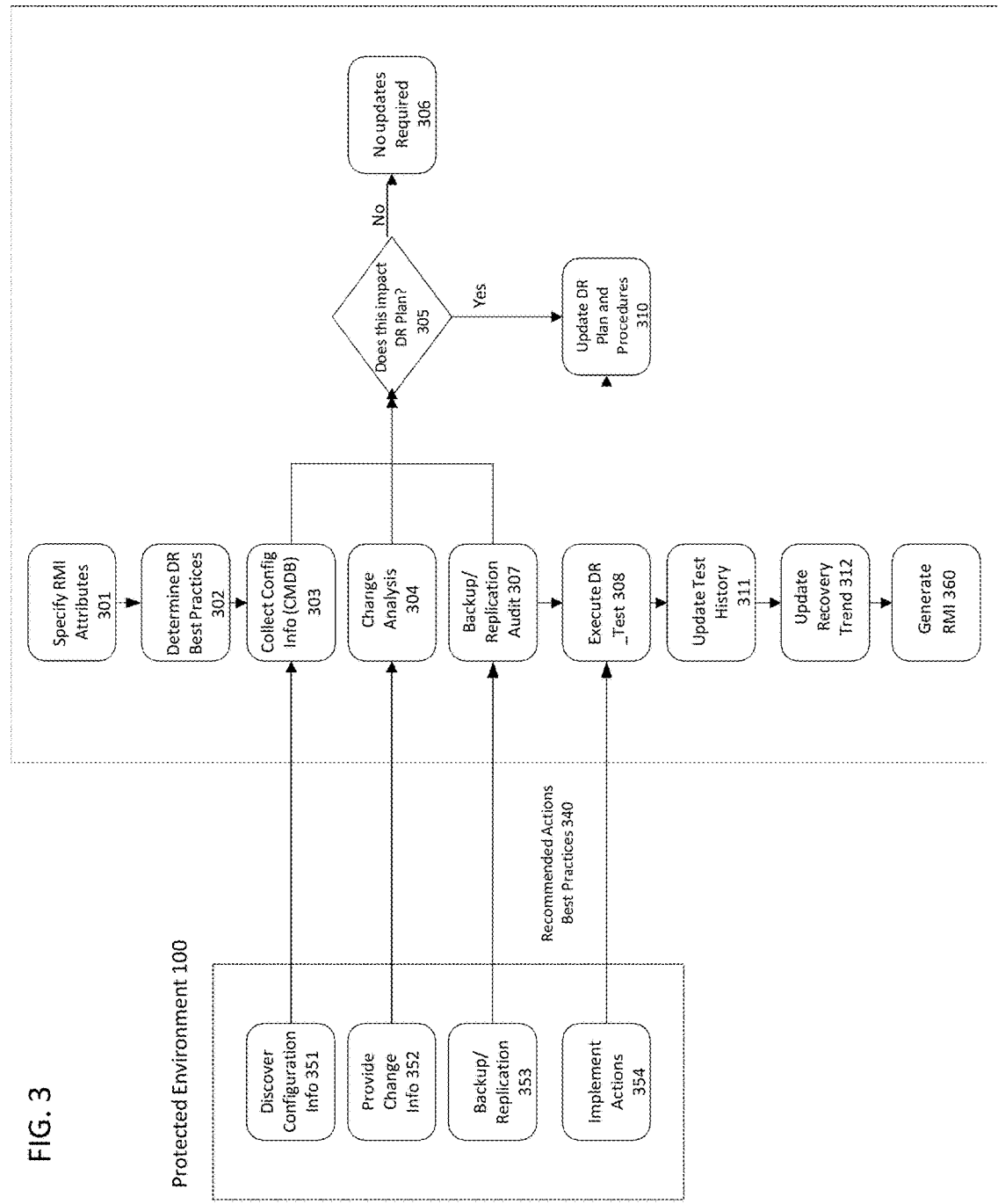
FIG. 3 is an example set of processes implemented by the production environment and the service provider.

Other aspects of the DR service provider 200 of interest include a service 201 that provides a Recovery Maturity Index (RMI) 205. FIG. 3 is a general example of a sequence of steps that may be performed in the customer environment 100 and by the service provider 200 to provide the RMI 205. In a typical scenario, the RMI 205 is generated, at least partially, in the context of an interactive tool that is used to run one or more DR tests 234. This may be cooperatively run by one or both of the customer administrator 110 and service provider administrator 210 such as during a consultation or a workshop. As a result of the DR tests 234, the RMI 205 is reviewed, updated, and scored using inputs from both the customer administrator 110 and provider administrator 210. Subsequent RMI 205 scoring can be performed during, for example, quarterly reviews or following changes to the production environment 100. In this way DR customers 100 are made aware of their progression within the RMI 205 framework and consequently, the impact on their readiness to successfully conduct a disaster recovery process 202.

More particularly, now, in a first step 301 the service provider 200 specifies attributes of the recovery maturity index 205. This may include specifications for RLCM, Automation, Test History, and/or Recovery Trend as will be discussed in more detail below.

As a subsequent or concurrent step, previously developed disaster recovery best practices information may be used as part of RMI assessment in step 302.

As a next sequence of steps, configuration information is discovered 351 from the production environment 100 and collected 303 by the service provider 200. Thus, in state 303 configuration information for the specific production environment 100 is obtained stored in the CMDB. The service provider 200 may collect this information manually or through automation tools such as the Recovery Execution System and/or Touch Free Disaster Recovery (TFDR) processes mentioned in more detail below. Examples of the types of configuration information obtained include things such as the types of applications running, the backup technologies used, network configurations, virtual machine configurations, physical machine configurations, operating systems, database configurations, and so forth.

Similarly, change information is periodically provided 352 by the production environment 100 to the DR service provider 200. In step 304, an analysis of these change(s) is performed. If in step 305 the changes do not impact a DR plan 234, then in step 306 no updates are needed. However, if the changes do impact a DR plan 234, then in step 310 such plan(s) are updated.

State 307 is executed to update the results of any backup/replication audit processes, which may be running during RLCM separately from the DR test 234.

In state 308, the selected DR test 234 itself is executed. The results of such a test may also cause updates to the DR plan 234.

State 317 updates a test history, and state 318 updates a recovery trend 318. Test history and recovery trend are more fully explained below.

In state 360 RMI score can be updated from these results. Whenever there is a change in status of RLCM, Automation, Test Success or Recovery Trend, RMI should be updated to keep it up to date.

Figure 4:
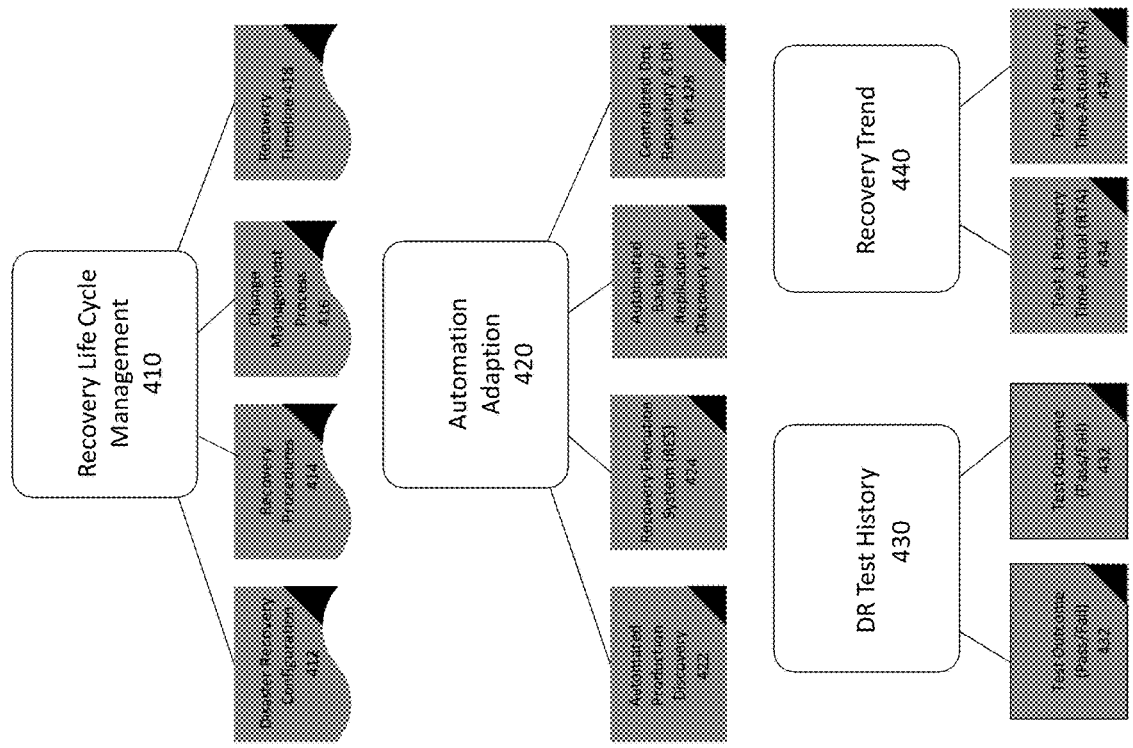
FIG. 4 illustrates aspects of a Recovery Maturity Index (RMI).

FIG. 4 illustrates example categories (or criteria) that may be used in step 360 to determine an RMI 205. These include Recovery Life Cycle Management (RLCM) 410, Automation Adaptation 420, DR Test History 430, and Recovery Trend 440. This is but one example of the possible categories used to arrive at the RMI 205. An associated set of elements, typically multiple elements for each such category, are then identified. The elements each consists of a set of instructions in the form typically of human readable questions that are to be presented to the customer administrator 110 and/or service provider administrator 210. A score is then determined for the answers to each element category pair. These scores may in turn typically be summed and weighted according to a relative importance to arrive at an overall RMI score.

For example, RLCM 410 may include elements such as Disaster Recovery (DR) Configuration 412, Recovery Procedures 414, Change Management Process 416, and Recovery Timeline 418.

Disaster Recovery configuration 412 can be captured manually, or automatically. It is needed so that the service provider can rebuild the protected environment 100. In most cases, the DR service provider 200 is not responsible for operating or maintaining the protected environment on a day-to-day basis, but needs a tool to recover configuration or at least be told what it is. The aforementioned U.S. Pat. Nos. 9,836,365 and 10,210,079 (incorporated by reference) describe some examples of tools for automated configuration discovery, but other off the shelf tools can be used as well.

Recovery procedures 414 are a set of step-by-step instructions needed to build, recover and validate the DR customers environment 100. Each customer will typically have a variety of procedures in place, regardless of whether the resources are deployed in a local data center 131, in a cloud 132, or in a hybrid cloud 133. These procedures can either, again be provided manually or can be generated automatically using the techniques such as described in the above-referenced patent applications.

Change Management Processes 416 are typically monitored by the service provider 200 in cooperation with the customer 100. As mentioned previously, since the service provider 200 does not manage the day-to-day operations of the customer's environment 100, this captures how well does the customer 100 keep the service provider 200 apprised of changes in the environment 100. The goal is to evaluate how confident the service provider 200 can be that it always has updated information about all planned changes in production environment that could potentially impact the recovery. The resulting RMI score 205, for example, may depend upon whether automated configuration discovery tools are being leveraged.

In the case where change notifications are manual, the score can depend on how well the customer environment 100 meets the expectations for informing the provider 200 of such changes. The more robust the change notification process, the more mature the recovery can be considered to be, and the higher the RMI 205. In one example where notifications are manual, a large-scale enterprise customer 100 may have 1000's of resources and will have formalized internal procedures to approve configuration changes on a regular basis. If there is a regular automated change notification using a change management tool than this RMI parameter will be scored highly, whereas if there is no regular reporting process in place the Change Management 416 scores are likely to be lower.

Recovery Timeline 418 is an assessment of whether any dependencies of one resource on another are properly accounted for in the disaster recovery plan. Complex environment may have a lot of dependencies between the different resources. For example, Production environment can have multi-tier environment with requirement that lower tier application like business critical application should be recovered first than file and print service, and network and storage platforms should be recovered first prior to any other infrastructure services like Active Directory and DNS. This is not representative of a workflow model and should be in existence to help execute the recovery in exact and accurate order to obtain the highest score. This again can either come from the customer or from the e tools that can be used to automate the discovery of dependencies. Again, the question is not whether these are manually or automatically generated with whether or not they are in place. Aforementioned automation solution like RES can help capture and save the resource dependencies and generate the timeline systematically to avoid human errors.

FIG. 4 is an example where the RMI 205 also takes into account Automation Adaption 420, including Automated Production Discovery (APD) 422, Recovery Execution System (RES) 424, Automated Backup/Replication Discovery (ABD) 426, and Centralized Documentation Repository 428.

Automated Production Discovery (APD) 422 indicates the customer is leveraging an automation tool that can, in turn, be used to automatically discover a customer production environment's 100 configuration. One such example is the Application Discovery and Dependency Mapping (ADDM) mapping product available from Micro Focus, but there are others.

Automated Backup/Recovery Discovery (ABRD) 426 indicates the presences of an automated tool that can discover storage backup configurations. As with the other tools, the customer 100 may choose to implement and manage one or more of these on their own, or they can be provided by the DR service provider. One example of such an automation tool is an analytics tool available from Aptare (Veritas).

Recovery Execution System (RES) 424 represents the availability of the tool, previously described, that can automate recovery processes.

Centralized Documentation Repository 428 relates to a tool that is used to capture and share recovery related information. For example, the DR service provider 200 may set up a Microsoft Sharepoint document directory for sharing access to related documentation with the customer 100.

Another parameter of the RMI index may include DR test history 430. This attribute, if present, can store past DR test 432 outcomes, and determine whether or not they exhibit consistent behavior over time. If the results have not been consistent, for example, the RMI score 205 may be lower, since it cannot be assumed that the DR processes in place are mature.

Finally DR recovery trend 440 may also be used as another category within the RMI 205. This parameter tracks the actual time to complete 434 (Recovery Time Actual) for past recovery attempts. An environment that is mature for DR is expected to exhibit this time to be decreasing.

Each of these automation related criteria 410-440 thus affect an overall RMI that is indicative of the DR customer's 100 recovery maturity. The individual category scores may be weighted in different ways and the results displayed in a dashboard. The results may be a numeric score, or coded with different colors to indicate relative strengths and weaknesses (with categories that are particularly strong colored in green, and those that are missing in red, and needing improvement in yellow).

FIG. 5 is an example of such a dashboard. This particular customer 100/service provider 200 has given the greatest weight to RLCM (60%) and has weighted automation components at 25%, Test History at 10% and Recovery Trend at 5%. It is to be understood of course that these relative weights can be different for other customers 100 or providers or even the same customer under different conditions.

The outcomes and scores shown have originated from a maturity valuation of the different categories described in FIG. 4.

For example, the RLCM score here of 60 represents a perfect total score in each of the Disaster Recovery (DR) Configuration 412, Recovery Procedures 414, Change Management Process 416, and Recovery Timeline 418 elements of the Recovery Life Cycle 410 parameter. The scores for each of these elements may have typically been determined during an audit of the DR customer's recovery processes. Such an audit may be conducted by the service provider 200 on a regular basis. The outcome of "yes" indicates this particular aspect of RLCM is mature.

The Automation columns display the scores determined for each of the Automation Adaptation 440 including Automated Production Discovery (APD) 422, Recovery Execution System (RES) 424, Automated Backup and Storage Discovery (ABD) 426, and Centralized Documentation Repository 428. Each of these categories contributes one-fourth, or 6.25% of the total 25% allocated to the Automation criteria.

Referring to the Automated Production Discovery (APD) score, this particular customer is using a manual configuration discovery process. Thus the "outcome" may be coded in yellow, since they have not yet leveraged available automation components that might assist with DR. They have however, been given the highest possible score of 6.25. This is because the audit indicates that the customer 100 has reliably given the service provider 200 all of the information needed to serve the DR function. If, however the customer had not provided enough information they would be given a lower score.

In this example, it is apparent that Test History 430 indicates widely varying results of DR tests (or actual DR events). Thus the score of zero has been assigned to this aspect of the RMI, and an outcome is coded red.

Finally, Recovery (Time) Trend 440 is apparently positive by decreasing recovery time over the period of time, indicating a full score of 5.0 and a green outcome.

Figure 6:
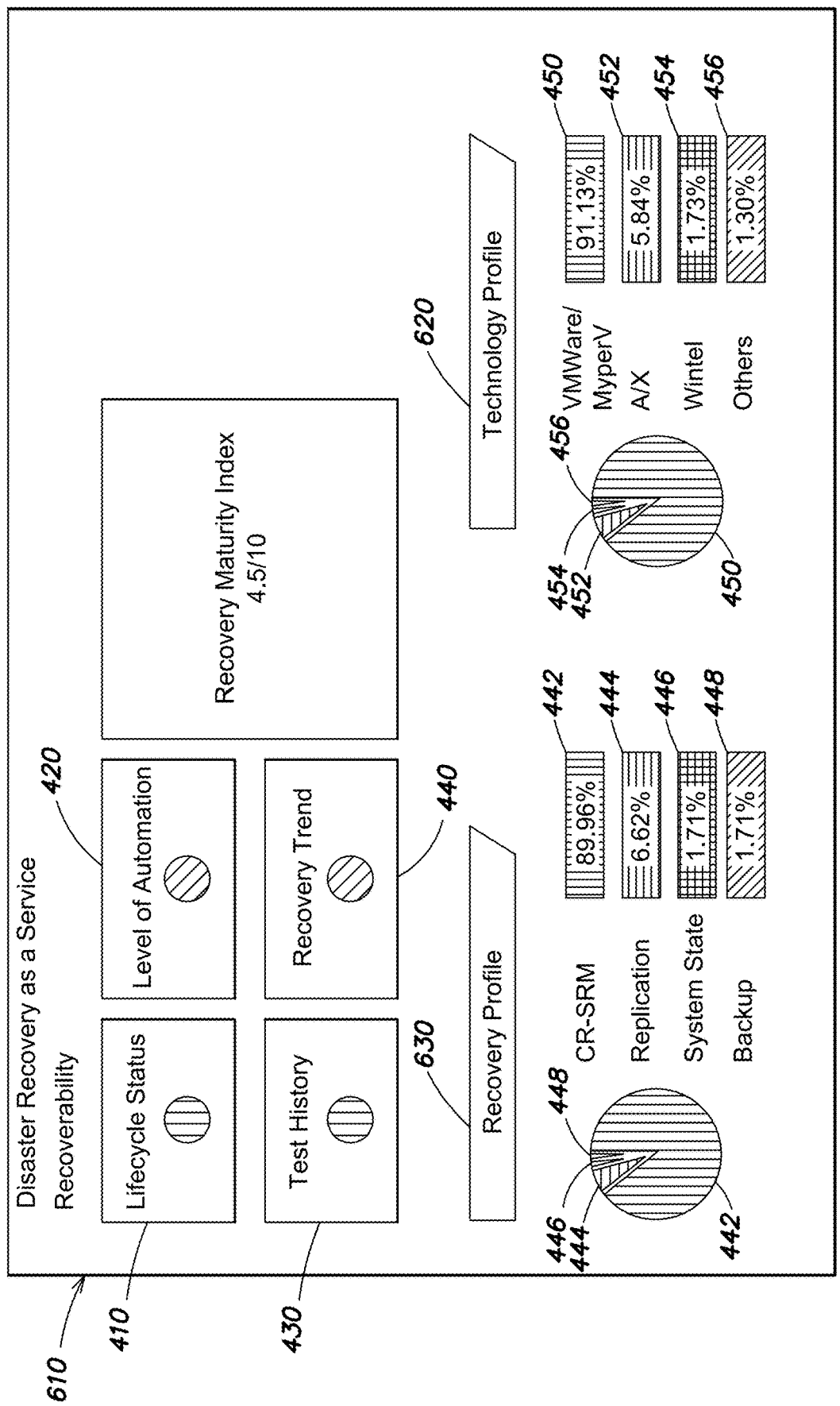
FIG. 6 is an example recovery report.

FIG. 6 is an example of a report that might be given to the customer. The report includes a high level summary of the dashboard information of FIG. 5. The recovery maturity index (RMI) information might be reported as the simple "four traffic lights" view 610 of each of the Life Cycle 410, Automation 420, Test History 430, and Recovery Trend 440. The simplified chart might also include other DR related information. This other information may include a Technology Profile 620 that lists the discovered resources, and the percentage-extent of their deployment in the environment 100. This particular profile is operating system (OS) specific and shows the user what percentages of the OS installations are VMWare, AIX, Windows, or other operating systems. The recovery profile 630 may speak to which recovery technologies are in use.

The invention claimed is:

1. A method for determining disaster recovery readiness for a data processing environment which includes one or more physical and/or virtual data processing infrastructure elements, and where a disaster recovery (DR) service provides disaster recovery for the infrastructure elements, the method comprising:
   a. storing information in a Recovery Maturity Index (RMI) representing one or more criteria indicative of expected successful DR test, the RMI further depending on availability of recovery maturity elements, and the recovery maturity elements comprise at least Recovery Life Cycle Management, and infrastructure component-related automation aspects related to one or more of automated storage and backup discovery, automated configuration discovery/application dependency, and automated recovery execution;

b. accepting data, via a user interface, representing one or more evaluations of one or more of the criteria specified in the RMI, where the user interface accepts the evaluations as a numerical score for each infrastructure element type and each further recovery maturity element, to thereby determine a matrix of numerical scores;

c. determining if the environment is ready for Disaster Recovery by comparing one or more of the evaluation(s) to predetermined information; and d. if the environment is determined to be ready for Disaster Recovery testing, enabling at least one DR test for execution.

2. The method of claim 1 wherein the recovery execution further comprises:
programmatically generating a master workflow with multiple phases, the master workflow generated from the configuration data for the configurable items within a scope for the recovery.

3. The method of claim 1 wherein the recovery maturity elements further comprise one or more recovery test histories.

4. The method of claim 1 wherein the recovery maturity elements further comprise one or more recovery trends.

5. The method of claim 1 where if a sum of the numerical scores in the matrix is below a defined score, it is determined that the environment is not likely ready for Disaster Recovery, and if the sum of numerical scores is above a second defined score, it is determined that the environment is likely ready for DR.

6. The method of claim 5 where the sum of the numerical scores is a weighted sum applying a different weight to at least two of the aspects of the RMI.

7. The method of claim 1 additionally comprising:
executing the DR test within a disaster recovery environment that is separate from the production environment.

8. The method of claim 1 additionally comprising:
providing further information related to one or more of the aspects of the RMI if the environment is determined to not be ready for DR testing.

9. The method of claim 8 additionally where:
d. the user interface accepts revised data representing one or more evaluations; and
e. a second step of determining if the environment is ready for DR testing based on the revised data.

10. An apparatus for determining disaster recovery readiness for a data processing environment which includes one or more physical and/or virtual data processing infrastructure elements, and where a disaster recovery (DR) service provides disaster recovery for the infrastructure elements, the apparatus comprising one or more processors for executing program code, the code for:

a. storing information in a Recovery Maturity Index (RMI) representing one or more criteria indicative of expected successful DR test, the RMI further depending on availability of recovery maturity elements, and the recovery maturity elements comprise at least Recovery Life Cycle Management, and infrastructure component-related automation aspects related to one or more of automated storage and backup discovery automated discovery/dependency, automated recovery execution, and automated recovery execution;

b. accepting data, via a user interface, representing one or more evaluations of one or more of the criteria specified in the RMI, where the user interface accepts the evaluations as a numerical score for each infrastructure element type and each further recovery maturity element, to thereby determine a matrix of numerical scores;

c. determining if the environment is ready for DR testing by comparing one or more of the evaluation(s) to predetermined information; and d. if the environment is determined to be ready for DR testing, enabling at least one DR test for execution.

11. The apparatus of claim 10 wherein the code for recovery execution further comprises:
programmatically generating a master workflow with multiple phases, the master workflow generated from the configuration data for the configurable items within a scope for the recovery.

12. The apparatus of claim 11 wherein the recovery maturity elements further comprise one or more recovery test histories.

13. The apparatus of claim 11 wherein the recovery maturity elements further comprise one or more recovery trends.

14. The apparatus of claim 11 where if a sum of the numerical scores in the matrix is below a defined score, it is determined that the environment is not likely ready for DR testing, and if the sum of numerical scores is above a second defined score, it is determined that the environment is likely ready for DR testing.

15. The apparatus of claim 14 where the sum of the numerical scores is a weighted sum applying a different weight to at least two of the aspects of the RMI.

16. The apparatus of claim 11 additionally comprising:
executing the DR test within a disaster recovery environment that is separate from the production environment.

17. The apparatus of claim 11 additionally comprising:
providing further information related to one or more of the aspects of the RMI if the environment is determined to not be ready for DR testing.

18. The apparatus of claim 17 additionally where:
d. the user interface accepts revised data representing one or more evaluations; and
e. a second step of determining if the environment is ready for DR testing based on the revised data.

* * * * *